J. T. Baggs,
Circular Saw Mill.
No. 107,211. Patented Sep. 13, 1870.

Witnesses:
A. Bennemendorf
S. S. Mabie

Inventor:
J. T. Baggs
Per
Attorneys.

United States Patent Office.

JAMES T. BAGGS, OF BRIDGEPORT, OHIO.

Letters Patent No. 107,211, dated September 13, 1870.

IMPROVEMENT IN SAWING-MACHINE.

The Schedule referred to in these Letters Patent and making part of the same.

*To all whom it may concern:*

Be it known that I, JAMES T. BAGGS, of Bridgeport, in the county of Belmont and State of Ohio, have invented a new and improved Sawing-Machine; and I do hereby declare that the following is a full, clear, and exact description thereof, which will enable others skilled in the art to make and use the same, reference being had to the accompanying drawing forming a part of this specification.

My invention relates to sawing-machines, and consists in certain improvements hereinafter described and specified in claim.

Similar letters of reference indicate corresponding parts.

Figure 1:
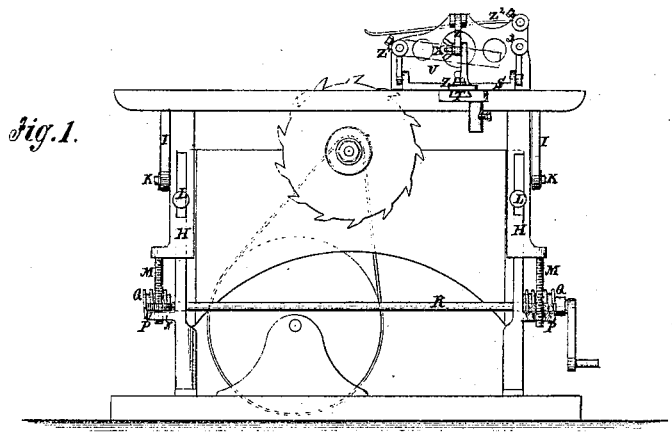
Figure 1 is a side elevation of my improved machine.
Figure 2:
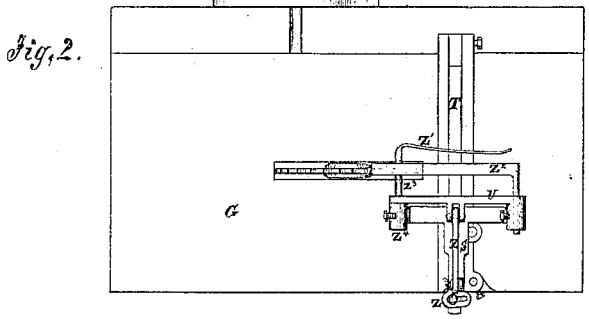
Figure 2 is a plan view.
Figure 4:
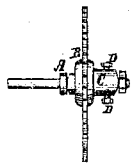
Figure 4 is a detail view of the saw-mandrel and the collars for holding the saw so as to wabble.
Figure 3:
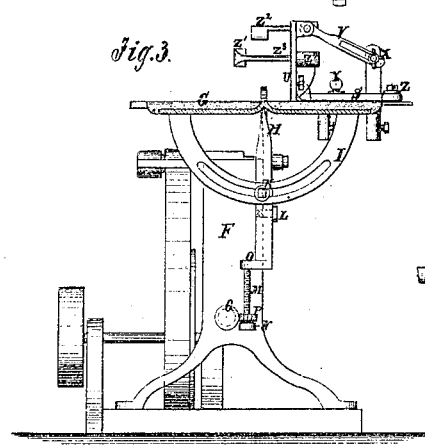
Figure 3 is an end elevation.
Figure 5:
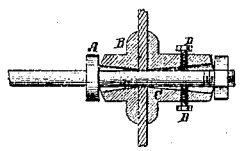
Figure 5 is a section through the collars.

I propose to hang the saw to run in a plane perpendicular to the arbor by the use of ordinary collars, with cylindrical holes fitting the arbor, to be screwed up against the collar A on the mandrel, for ordinary sawing; and for cutting wide grooves, making rebates, and the like, I propose to hang the saw so that it will wabble; and for this I provide collars, B and C, with the outer ends curved on radii extending to the center of the saw, and with holes widening on two sides from the inner ends outward, to admit of adjusting the said collars obliquely on the mandrel.

The collar c is provided with set-screws, D, on the same sides with the widened parts of the holes, curving against the mandrel, and shifting the collars and the saw, to make the latter more or less oblique.

It will be seen that, by this arrangement, the saw can be adjusted without loosening the clamping-nut E.

The saw-arbor is mounted in the top of the frame F, which may serve as a table for ordinary work, for which it is not necessary to use my adjustable table G, which is mounted on knife-edges on the top of vertical supports, H, and provided with semicircular slotted braces, I, working over clamping-screws, K, for clamping them against the supports H, to hold the table level, or at any other required inclination.

These supports H are grooved at one side, and fitted to slide up and down on the edges of the end supports of the frame F, to which they are held by screws, L, passing through slots which admit them to slide on the said screws.

M represents adjusting-screws resting in steps in brackets, N, on the frame, and screwing through lugs, O, on the supports H. They are provided with worm-wheels, P, gearing with worms, Q, on a shaft, R, extending from end to end of the frame, and provided with a hand-crank, for turning it to raise or lower the table.

The gauge consists of a clamp, S, for clamping to a slide, T, and a plate, U, jointed to the plate S, so as to stand in a vertical or oblique plane, and be held in any position by a slotted brace, V, jointed to plate U, and connected to a post, W, on the plate S by a clamping-screw, X.

This plate U is jointed to plate S by means of pins on the latter passing through slots in lugs on the frame, so that the lower edge of the plate U will always rest on the table, no matter what may be the inclination of it.

The slide is arranged in a dovetail-groove extending across the table, for the purpose of changing the guide from side to side of the saw, as may be sometimes required.

The slide is also made long to fill the groove across the table, and prevent the sawdust from working in between it and the walls of the groove.

This arrangement is also useful in setting the guide to a scale, the same being arranged with the edge of the table.

The plate S is pivoted to the slide T by a set-screw, Y, on which it oscillates for adjustment to lines parallel with the side of the saw, and the outer end of the plate has a curved slot, through which a clamping-screw, Z, passes to secure it when properly adjusted.

$Z^1$ is a spring attached to the side of the guide-plate U, near the upper edge, by a shank, $Z^3$, fitted to slide in and out of a tubular holder, $Z^4$, where it is held by a set-screw, which admits of adjusting to the spring for wide or narrow strips, which this spring is designed to hold up snugly against the side of the guide.

$Z^2$ is a spring, similarly attached, and arranged to bear upon the top of the strips to hold them down.

It will be seen that this machine may be used for a great variety of work besides ordinary sawing; for example, plowing window-frames, rebating doors, windows, and moldings, making dovetail-grooves, cornering moldings, ripping angular strips, and many other operations.

The table may be readily taken off by removing the screws L.

Having thus described my invention,

What I claim as new, and desire to secure by Letters Patent, is—

1. The table G and the semicircular slotted braces I, in combination with knife-edged supports H and clamping-screws K, each constructed as and for the purpose specified.

2. The combination, with the frame F and table G, of the slides H, screws M, shaft R, worm-gears Q P, semicircular slotted arms I, and clamp-screws K L, all substantially as specified.

3. The combination, with the guide-plate U, of the spring-guides $Z^1$ and $Z^2$, substantially as specified.

Witnesses:         JAMES T. BAGGS.
  A. J. BAGGS,
  R. H. CLAYLAND.